US007797122B2

(12) United States Patent
Tabor et al.

(10) Patent No.: US 7,797,122 B2

(45) Date of Patent: Sep. 14, 2010

(54) ELECTROHYDRAULIC VALVE CONTROL CIRCUIT WITH VELOCITY FAULT DETECTION AND RECTIFICATION

(75) Inventors: Keith A. Tabor, Richfield, WI (US); Brian R. Bertolasi, Waukesha, WI (US)

(73) Assignee: INCOVA Technologies, Inc., Waukesha, WI (US)

( * ) Notice: Subject to any disclaimer, the term of this patent is extended or adjusted under 35 U.S.C. 154(b) by 576 days.

(21) Appl. No.: 11/831,341

(22) Filed: Jul. 31, 2007

(65) Prior Publication Data

US 2008/0034853 A1 Feb. 14, 2008

Related U.S. Application Data

(60) Provisional application No. 60/821,877, filed on Aug. 9, 2006.

(51) Int. Cl.
*G06F 19/00* (2006.01)

(52) U.S. Cl. ...................................................... 702/114

(58) Field of Classification Search ................. 702/114; 192/3.23; 91/364; 73/118.1
See application file for complete search history.

(56) References Cited

U.S. PATENT DOCUMENTS 5,509,520 A * 4/1996 Evans et al. ................ 192/3.23
6,328,275 B1 12/2001 Yang et al.
6,357,334 B1 * 3/2002 Mickowski .................. 91/364
6,775,974 B2 8/2004 Tabor

* cited by examiner

*Primary Examiner*—Bryan Bui
(74) *Attorney, Agent, or Firm*—Quarles & Brady, LLP; George E. Haas

(57) ABSTRACT

Motion of a hydraulically driven machine component is controlled in response to a velocity command that indicates a desired velocity for the machine component. A method for detecting a velocity fault involves determining an actual velocity at which the machine component is moving, and producing a velocity error value based on a difference between the velocity command and the actual velocity. The velocity error value is integrated, such as by a low pass, biquadratic filter function, to produce an integrated value. The integrated value is compared to one or more thresholds to determine whether a velocity fault has occurred.

22 Claims, 2 Drawing Sheets

VELOCITY FAULT DETECTION ROUTINE

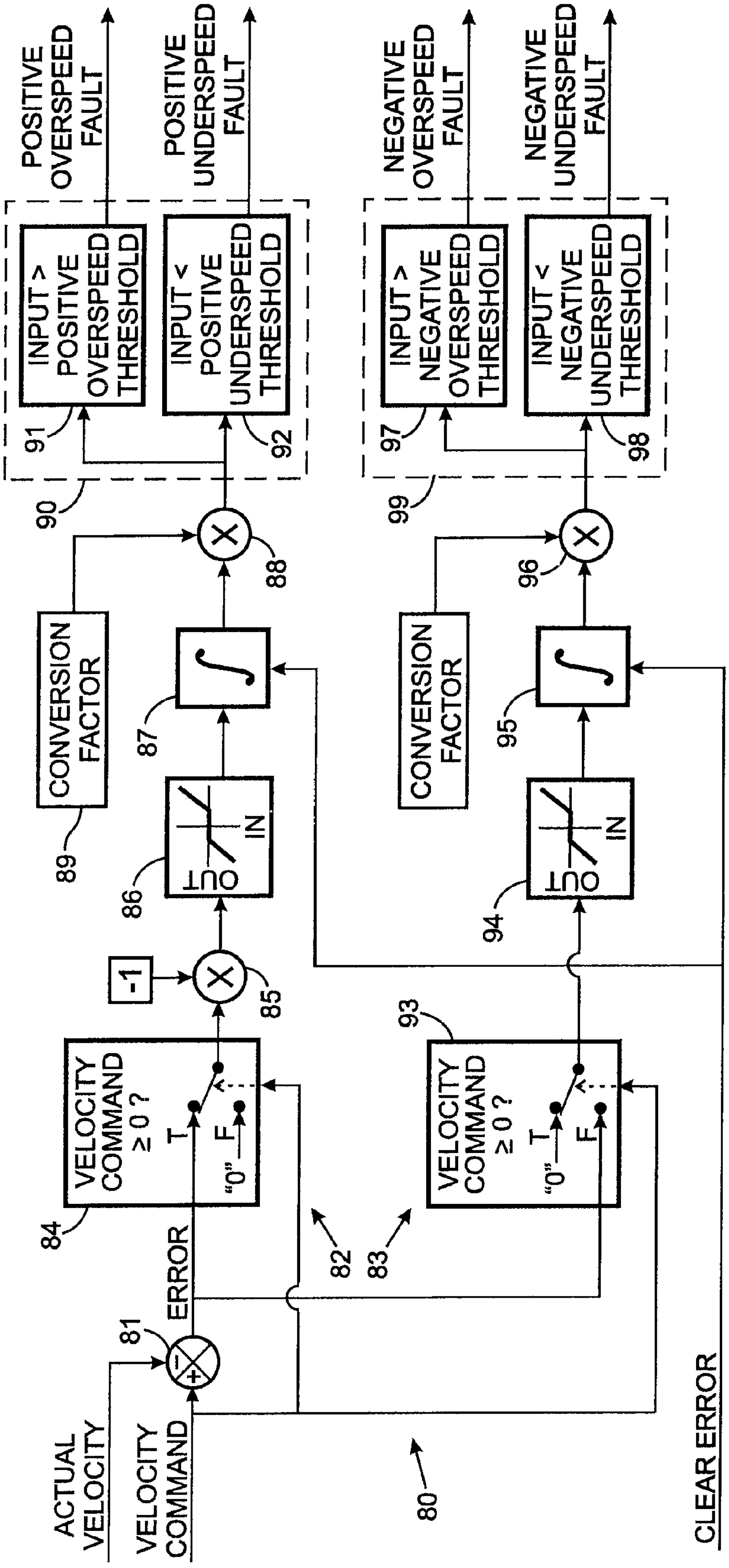
FIG. 3 VELOCITY FAULT DETECTION ROUTINE

ELECTROHYDRAULIC VALVE CONTROL CIRCUIT WITH VELOCITY FAULT DETECTION AND RECTIFICATION

CROSS-REFERENCE TO RELATED APPLICATIONS

This application claims benefit of U.S. Provisional Patent Application No. 60/821,877 filed on Aug. 9, 2006.

STATEMENT REGARDING FEDERALLY SPONSORED RESEARCH OR DEVELOPMENT

Not Applicable

BACKGROUND OF THE INVENTION

1. Field of the Invention

The present invention relates to hydraulic power systems with electrically operated valves that control fluid flow to hydraulically drive actuators, and more particularly to mechanisms that detect faults occurring in such systems.

2. Description of the Related Art

A wide variety of machines have moveable elements that are driven by a hydraulic actuator, such as a cylinder and piston arrangement. For example, a telehandler has a tractor on which a telescopic boom is mounted with a load carrier pivotally attached to the remote end of the boom. The telescopic boom and the load carrier are moved with respect to the tractor by hydraulic actuators. The flow of fluid to and from each hydraulic actuator is governed by a valve assembly controlled by the machine operator.

There is a present trend away from manually operated hydraulic valves toward electrical controls and the use of solenoid valves. For example, the operator sitting in a cab of the telehandler manipulates a joystick that produces an electrical signal designating a velocity desired for an associated element, such as the boom or load carrier. An electronic controller responds to the joystick signal by applying electric current to the valve assembly so that the proper amount of fluid is supplied to the respective hydraulic actuator to move the machine component at the desired velocity.

It is important to detect velocity faults or errors between the actual velocity of a machine component and the desired velocity. Such errors may result in an unsafe operation of the machine and thus require corrective action. On a telehandler, for example, it is desirable to detect a sudden drop of the boom which could occur due to a burst hose or other event. Upon detection of a velocity error, corrective action, such as operating a secondary isolation valve, can be performed.

Therefore, it is desirable to detect a velocity error of a machine component in order to take proper corrective action. However, such detection must be sufficiently robust to avoid erroneously declaring a fault condition because taking corrective action during normal machine action also may have adverse consequences.

SUMMARY OF THE INVENTION

A method is provided for detecting a velocity fault of a machine component that is hydraulically driven. This method comprises receiving a velocity command that indicates a desired velocity for the machine component and determining an actual velocity at which the machine component is moving. A velocity error value is produced based on a difference between the velocity command and the actual velocity and the velocity error value is integrated to produce an integrated value. Then the integrated value is analyzed to determine whether a velocity fault has occurred.

Integrating the velocity error value ensures that an over speed or an under speed condition must persist for a defined period of time before a velocity fault is declared. In a preferred implementation, the integrating is accomplished by a biquadratic filter function which decreases the integrated value for error frequencies that are below a cutoff frequency.

To determine whether a velocity fault has occurred, the integrated value preferably is analyzed by a threshold operation. The preferred threshold operation compares the integrated value to an over speed threshold and an under speed threshold. An over speed fault is declared when the integrated value is greater than the over speed threshold, and an under speed fault is declared when the integrated value is less than the under speed threshold.

BRIEF DESCRIPTION OF THE DRAWINGS

FIG. 3 is a control diagram depicting a velocity fault detection mechanism.

DETAILED DESCRIPTION OF THE INVENTION

Figure 1:
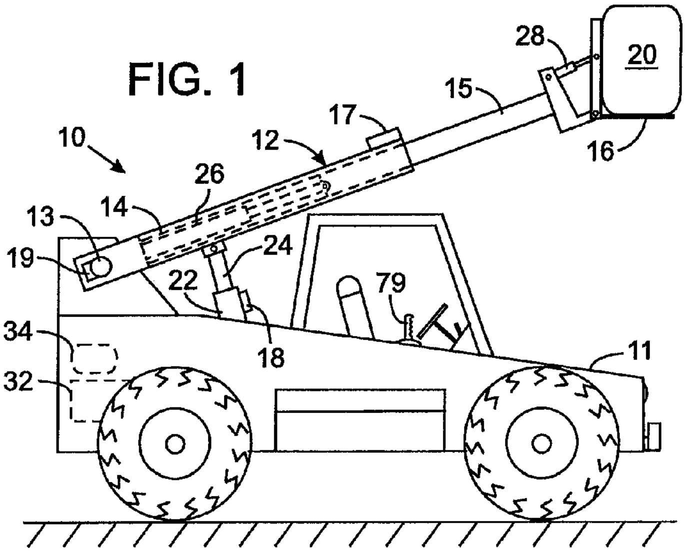
FIG. 1 shows a telehandler that incorporates a hydraulic system which employs the present invention.

With initial reference to FIG. 1, a telehandler 10 is an example of a machine on which the present invention can be used, with the understanding that the invention has application to a wide variety of machines. The telehandler 10 has a carriage 11 with an operator cab. The carriage 11 supports an engine or battery powered motors (not shown) for driving the wheels across the ground and for powering a hydraulic system. A boom assembly 12 comprises a boom 14, an arm 15, and a load carrier 16. The boom 14 is pivotally attached to the rear of the carriage 11 and is raised and lowered by a boom hydraulic actuator 21, in this case a pair of boom cylinders 22 each having a piston rod 24 (only one cylinder/piston rod arrangement is visible in FIG. 1). An arm hydraulic actuator 26 causes the arm 15 to slide telescopically within the boom 14 thereby extending and retracting the length of the boom assembly 12. The load carrier 16 is pivotally mounted at the remote end of the arm 15 and may comprise any one of several structures for carrying a load 20. The load carrier 16 is tilted up and down by a load carrier hydraulic actuator 28.

The present hydraulic system controls boom motion in terms of the boom hydraulic actuator 21. For that purpose, a conventional sensor produces an electrical signal in response to motion of the boom assembly with respect to the carriage 11 in order to provide an indication of the actual velocity of the boom hydraulic actuator 21. For example, a linear transducer 18 indicates the extension distance of a piston rod 24 from one of the boom cylinders 22 wherein that position signal is differentiated to derive the boom velocity. Alternatively, a velocity sensor could directly sense the boom hydraulic actuator velocity. The boom velocity also could be calculated from sensing the fluid flow to or from the boom cylinders. As an alternative sensor, an accelerometer 17 may be mounted on the boom 14 with its signal being integrated to produce a boom velocity signal, which then is converted trigonometrically into the corresponding boom hydraulic actuator velocity. Similarly, a resolver or encoder 19 can be attached to the pivot shaft 13 of the boom with its position signal being differentiated into a boom velocity value that then is converted into the velocity of the boom hydraulic actuator 21. The velocity of the boom hydraulic actuator is arbitrarily defined as being positive when the boom is being raised and being negative when lowering the boom. As a further alternative, the hydraulic system 30 could control the motion in terms of velocity of the boom 14 thereby enabling velocity values from sensors on the boom assembly to be used without conversion. Thus the component of the telehandler 10, the velocity of which is being controlled, may be the actuator or the element that is moved by the actuator, e.g. the boom 14.

Figure 2:
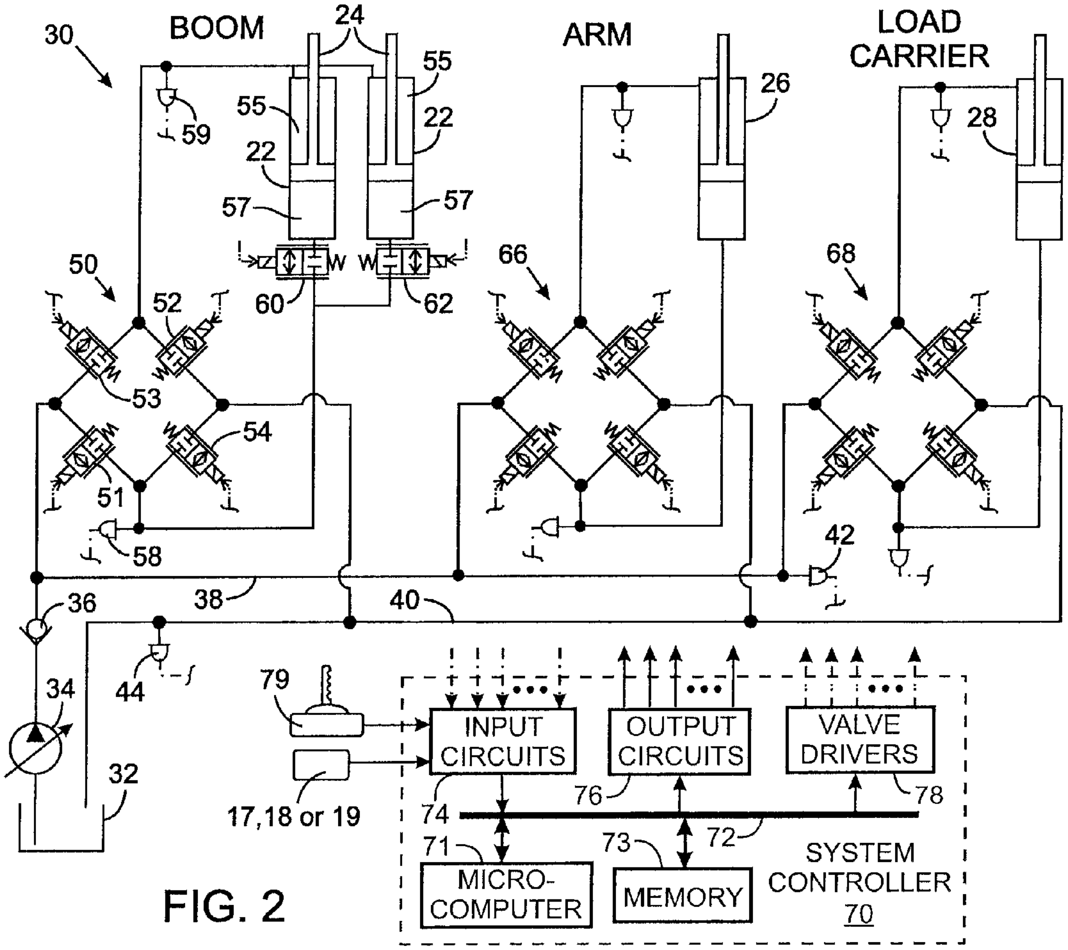
FIG. 2 is a schematic diagram of the hydraulic system.

With additional reference to FIG. 2, the telehandler 10 has a hydraulic system 30 that controls movement of the boom 14, the arm 15, and the load carrier 16. Hydraulic fluid is held in a reservoir, or tank, 32 from which the fluid is drawn by a conventional variable displacement pump 34 and fed through a check valve 36 into a supply line 38. Alternatively, a fixed displacement pump may be utilized with an unloader valve at its outlet to control the supply line pressure. A tank return line 40 also runs through the telehandler 10 and provides a conduit for the hydraulic fluid to flow back to the tank 32. A pair of pressure sensors 42 and 44 provide electrical signals that indicate the pressure in the supply line 38 and the tank return line 40, respectively.

The supply line 38 furnishes hydraulic fluid to a first control valve assembly 50 comprising a Wheatstone bridge configuration of four electrohydraulic proportional (EHP) valves 51, 52, 53 and 54 which control the flow of fluid to and from the two boom hydraulic cylinders 22. A separate EHP isolation valve 60 or 62 is located immediately adjacent each boom cylinder 22 and connect the first control valve assembly 50 to the respective cylinder's head chamber 57. Each of these EHP valves 51-54, 60, 62 and other electrohydraulic proportional valves in the system 30 preferably are bidirectional poppet valves, thereby controlling flow of hydraulic fluid flowing in either direction through the valve. These EHP valves may be the type described in U.S. Pat. No. 6,328,275, for example, however other types of control valves, including an electrically operated spool valve, can be used.

A first pair of the EHP valves 51 and 52 governs the fluid flow from the supply line 38 into the head chamber 57 on one side of the piston in the boom cylinder 22 and from a rod chamber 55, on the opposite side of the piston, to the tank return line 40. This action extends the piston rod 24 from the boom cylinder 22 which raises the boom 14. A second pair of EHP valves 53 and 54 controls the fluid flow from the supply line into the rod chamber 55 and from the head chamber 57 to the tank return line, which retracts the piston rod into the cylinder 22 thereby lowering the boom 14. By controlling the rate at which pressurized fluid is sent into one cylinder chamber and drained from the other chamber, the boom 14 can be raised and lowered in a controlled manner. A first pair of pressure sensors 58 and 59 provide electrical signals indicating the pressure in the two chambers of the boom cylinder 22.

A second control valve assembly 66, similar to the first control valve assembly 50, controls the flow of hydraulic fluid into and out of the arm hydraulic cylinder 26. Operation of the second control valve assembly 66 extends and retracts the arm 15 with respect to the boom 14. A third control valve assembly 68 controls fluid flow to and from a load carrier cylinder 28 that tilts the load carrier 16 up and down with respect to the remote end of the arm 15.

With continuing reference to FIG. 2, operation of the hydraulic system 30 is governed by a system controller 70 that includes a microcomputer 71 connected by conventional signal busses 72 to a memory 73 in which software programs and data are stored. The set of signal busses 72 also connects input circuits 74, output circuits 76 and valve drivers 78 to the microcomputer 71. The input circuits 74 interface a joystick 79, the boom motion sensor, and the pressure sensors and other devices to the system controller. The output circuits 76 provide signals to devices that indicate the status of the hydraulic system 30 and the functions being controlled.

A set of valve drivers 78 in the system controller 70 responds to commands from the microcomputer 71 by generating pulse width modulated (PWM) signals that are applied to the EHP valve assemblies 50, 66 and 68. Each PWM signal is generated in a conventional manner by switching a DC voltage at a given frequency. When the hydraulic system is on a vehicle, such as a telehandler, the DC voltage is supplied from a battery and an alternator. By controlling the duty cycle of the PWM signal, the magnitude of electric current applied to a given valve can be varied, thus altering the degree to which that valve opens. This proportionally controls the fluid flowing through the valve to or from the associated hydraulic actuator.

To raise or lower the boom 14, the machine operator moves the joystick 79 in the appropriate direction to produce an electrical signal indicating the desired velocity for the boom cylinder 22, and indirectly the boom assembly 12. The system controller 70 responds to the joystick signal by generating a velocity command and from that command derives current commands that designate electric current magnitudes for driving selected EHP valves 51-54 in order to apply fluid to the two boom cylinders 22 and produce the desired motion. Those current commands are sent to the valve drivers 78 which apply the appropriate electric current magnitudes to the selected EHP valves 51-54. Thus, the hydraulic valves in assembly 50 are opened and closed to various degrees by varying the electric currents applied to those valves. Current commands also are sent to the valve drivers 78 to open fully the two isolation valves 60 and 62. The control technique described in U.S. Pat. No. 6,775,974 may be used by the controller.

For example, when the machine operator desires to extend the rods 24 from the boom cylinders 22 and raise the boom assembly 12, the electric current commands open the first and second EHP valves 51 and 52 by amounts that enable the proper level of fluid flow. Opening the first EHP valve 51 sends pressurized hydraulic fluid from the supply line 38 into the boom cylinder head chambers 57 and opening the second EHP valve 52 allows fluid from the rod chambers 55 to flow to the tank 32. The system controller 70 monitors the pressure in the various hydraulic lines to properly operate the valves. To retract the rods 24 into the boom cylinders 22 and lower the boom assembly, the system controller 70 opens the third and fourth EHP valves 53 and 54, which sends pressurized hydraulic fluid from the supply line 38 into the boom cylinder rod chambers 55 and exhausts fluid from the head chambers 57 to tank 32. The force of gravity aids in lowering the boom assembly 12.

With reference to FIG. 3, the system controller 70 continuously executes a velocity fault detection routine 80 as part of the software for controlling the telehandler 10. That routine receives the velocity command produced in response to the signal from the joystick 79 and also receives the signal from the sensor 17, 18 or 19 which indicates the actual velocity of the boom assembly 12. Those signals are applied to an arithmetic function 81 which produces a velocity ERROR value by calculating the difference between the velocity command (a desired velocity) and the actual boom velocity. The velocity ERROR, or difference, value is applied to two branches 82 and 83 of the velocity fault detection routine 80. The first branch 82 is active when a positive velocity of the boom is commanded, whereas the second branch 83 is active for negative velocity commands. Two branches are provided so that an over speed or an under speed condition in one direction does not affect operation in the other direction. Note that the velocity of the boom has been arbitrarily defined as being positive when the boom is being raised.

The first branch 82 commences at a first selection function 84 where a determination is made whether the velocity command is positive, i.e. to raise the boom. If so, the velocity ERROR value is passed to the output of the first selection function 84, otherwise the output is set to zero, thereby effectively disabling the first branch 82. Assuming that the velocity command is positive, the velocity ERROR value is adjusted by a first multiplier function 85 which multiplies the velocity ERROR by minus one (−1), so that a positive velocity ERROR value represents an over speed condition. The adjusted velocity ERROR value from the first multiplier function 85 is applied to the input of a first dead band function 86, so that relatively small velocity errors will be ignored and a fault condition will not be declared as a result. The first dead band function 86 produces a zero output when the adjusted velocity ERROR value is within a predefined range of values centered about zero, otherwise the adjusted velocity ERROR value is passed after being offset by an amount equal to the upper or lower limit of the dead band.

Simply determining when the adjusted velocity ERROR value exceeds a given threshold is not robust enough to avoid erroneously declaring a velocity fault condition. Large velocity errors typically occur for short durations when the boom-arm assembly strikes an object. A sizeable momentary over speed condition also exists immediately after the operator commands the boom motion to stop and a momentary under speed condition also occurs immediately after the operator commands the boom motion to commence from a stop. Therefore, the two branches 82 and 83 of the fault detection routine employ integration so that an over speed or under speed condition must persist for a period of time before declaring a fault condition.

Therefore, the output of the first dead band function 86 is applied to a first integration function 87 which forms a leaky integrator that is functionally equivalent to low pass filter with a very low cutoff frequency (e.g. 0.05 Hz) and high gain. The first integration function 87 preferably is implemented by a biquadratic filter having a filter function given by the expression:

$$y(n) = \frac{B0*x(n) + B1*x(n-1) + B2*x(n-2)}{A1*y(n-1) + A2*y(n-2)}$$

where y(n) is the filter function output referred to as an integrated value, A1, A2, B0, B1 and B2 are filter coefficients, x(n) is the present output value from the dead band function 86, x(n−1) and x(n−2) are the previous two dead band function output values, and y(n−1) and y(n−2) are the last two integrated values from the filter. At low frequencies, below a cutoff frequency defined by the filter coefficients, the filter leaks (i.e. decays) which drives the integrated value to zero over time, whereas above the cutoff frequency the filter act as an integrator. That integration converts error indication from a velocity value to a position value.

That position value is applied to a first unit conversion function 88 where it is multiplied by a conversion factor 89 to convert the position error into the desired units of distance. The resultant position value then is applied to a first threshold operation 90 to an over speed threshold and an under speed threshold. Specifically the first threshold operation 90 comprises a first threshold function 91 that compares the position value to a positive over speed threshold, and a second threshold function 92 that compares the position value to a positive under speed threshold. When the positive over speed threshold is exceeded, a positive over speed fault is declared by first over speed function 91. Similarly, if the speed is below the positive under speed fault threshold, a positive under speed fault is declared by a first under speed function 92. These fault signals are binary thereby indicating whether a fault is or is not occurring.

If the first dead band function 86 was eliminated and a true integrator used in the first integration function 87, small errors continue to accumulate over time until an error threshold eventually is reached. However, when determining the fault thresholds for functions 91 and 92, it is helpful to consider the leaky first integration function 87 as a true integrator over a relatively small time period. In this way, the thresholds can be considered as a maximum allowable distance error after the velocity error is integrated. The dead band limits, cutoff frequency and gain of the first integration function 87, and the fault detection thresholds are parameters that are determined and adjusted for the particular type of machine in order to ensure proper operation.

A clear ERROR command can be produced by the system controller 70 and applied to reset the first integration function 87 to zero. This avoids the accumulation of errors over a prolonged period of machine operation from producing continuous speed fault declarations.

The second branch 83 is similar to the first branch 82, except the second selection function 93 renders the second branch active only when the velocity command is negative (i.e. a boom lower command). In other words, the velocity ERROR value is passed into the second branch 83 only upon occurrence of a negative velocity command, otherwise a zero value is applied to the downstream components in the second branch which thereby is disabled from indicating a fault condition. The output of the second selection function 93 is applied unadjusted to a second dead band function 94 which produces an output that is applied to a leaky second integration function 95. The results of that latter function are then applied to a second units converter 96 to generate a signal representing the error in terms of a position. That position error then is compared by third and fourth threshold functions 97 and 98 of a second threshold operation 99 to a negative over speed threshold and a negative under speed threshold, respectively. When one of those negative thresholds is exceeded, a negative over speed fault indication or a negative under speed fault indication is generated.

It also should be understood that a particular machine may not require all the positive and negative over speed and under speed fault indications, as one or more of them may not correspond to a potentially hazardous condition.

The system controller 70 responds to the fault indications from the velocity fault detection routine 80 by taking the appropriate corrective action. For example, in response to an over speed fault condition, the system controller 70 operates the two isolation valves 60 and 62 for the boom cylinders 22, thereby stopping any motion of the boom assembly 12. As noted, these isolation valves are located in close proximity to the respective boom cylinders 22 and thus prevent fluid from exiting the head chambers 57 should the hose connecting those cylinders to the valve assembly 50 burst. A similar safeguard occurs if the first or fourth valve 51 or 54 fails in the open position. In place of the isolation valves, a mechanical stop on the load holding side of the actuator could be activated to arrest motion of the boom assembly 12.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention.

The invention claimed is:

1. A method for detecting a velocity fault of a machine component that is hydraulically driven, said method comprising receiving a velocity command that indicates a desired velocity for the machine component;

determining an actual velocity at which the machine component is moving;

producing a velocity error value based on a difference between the velocity command and the actual velocity;

integrating the velocity error value to produce an integrated value;

determining from the integrated value whether a velocity fault has occurred; and upon occurrence of a fault producing an electrical fault indication signal.

2. The method as recited in claim 1 wherein integrating the velocity error value employs a biquadratic filter function.

3. The method as recited in claim 1 wherein integrating the velocity error value employs a filter function that decreases the integrated value for error frequencies that are below a cutoff frequency.

4. The method as recited in claim 3 wherein the cutoff frequency defined by coefficients of the filter function.

5. The method as recited in claim 1 wherein integrating the velocity error value comprises applying a filter function so that an over speed or an under speed condition must persist for a defined period of time before a velocity fault is declared.

6. The method as recited in claim 1 further wherein determining whether an velocity fault has occurred comprises comparing the integrated value to a threshold.

7. The method as recited in claim 1 further wherein determining whether a velocity fault has occurred comprises comparing the integrated value to an over speed threshold and an under speed threshold.

8. The method as recited in claim 7 wherein an over speed fault is declared when the integrated value is greater than the over speed threshold; and an under speed fault is declared when the integrated value is less than the under speed threshold.

9. The method as recited in claim 1 wherein determining whether a velocity fault has occurred comprises:

converting the integrated value to a distance indication;

declaring an under speed fault when the distance indication is less than an under speed threshold; and declaring an over speed fault when the distance indication is greater than an over speed threshold.

10. The method as recited in claim 1 wherein prior to integrating the velocity error value, a dead band function is applied to the velocity error value.

11. The method as recited in claim 1 wherein prior to integrating the velocity error value, if the velocity error value is less that a first value and greater than a second valve, the velocity error value is set to zero.

12. The method as recited in claim 1 further comprising, in response to determining that velocity fault has occurred, stopping motion of the machine component.

13. A method for detecting a velocity fault of a machine component that is hydraulically driven, said method comprising receiving a velocity command that indicates a desired velocity for the machine component;

determining an actual velocity at which the machine component is moving;

producing a velocity error value based on a difference between the velocity command and the actual velocity;

if the velocity command designates movement of the machine component in a first direction, then:

a) multiplying the velocity error value by minus one to produce an adjusted velocity error value, b) integrating the adjusted velocity error value to produce a first integrated value, and c) determining from the first integrated value whether a velocity fault has occurred; and if the velocity command designates movement of the machine component in a second direction, then:

d) integrating the velocity error value to produce a second integrated value, and e) determining from the second integrated value whether a velocity fault has occurred.

14. The method as recited in claim 13 wherein integrating the first adjusted velocity error value and integrating the velocity error value both employ a filter function that decreases the integrated value for error frequencies that are below a cutoff frequency.

15. The method as recited in claim 14 wherein the filter function is a biquadratic filter function.

16. The method as recited in claim 13 wherein integrating the first adjusted velocity error value and integrating the velocity error value both employ a filter function so that an over speed or an under speed condition must persist for a defined period of time before a velocity fault is declared.

17. The method as recited in claim 13 wherein determining from the first integrated value whether a velocity fault has occurred employs a first threshold operation; and determining from the second integrated value whether a velocity fault has occurred employs a second threshold operation.

18. The method as recited in claim 17 wherein the first threshold operation comprises comparing the first integrated value to a first over speed threshold and to a first under speed threshold; and the second threshold operation comprises comparing the second integrated value to a second over speed threshold and to a second under speed threshold.

19. The method as recited in claim 18 wherein an over speed fault is declared when the first integrated value is greater than the first over speed threshold or the second integrated value is greater than the second over speed threshold; and an under speed fault is declared when the first integrated value is less than the first under speed threshold or the second integrated value is less than the second under speed threshold.

20. The method as recited in claim 13 wherein determining whether a velocity fault has occurred comprises:

converting one of the first integrated value and the second integrated value to a distance indication;

declaring an under speed fault when the distance indication is less than an under speed threshold; and declaring an over speed fault when the distance indication is greater than an over speed threshold.

21. The method as recited in claim 13 wherein prior to integrating the adjusted velocity error value, a dead band function is applied to the adjusted velocity error value; and prior to integrating the velocity error value, a dead band function is applied to the velocity error value.

22. The method as recited in claim 13 further comprising, in response to determining that velocity fault has occurred, stopping motion of the machine component.

* * * * *